US012807160B2

(12) United States Patent
Veit

(10) Patent No.: US 12,807,160 B2
(45) Date of Patent: Nov. 24, 2026

(54) ANGULAR POSITION DETECTION DEVICE IN A HYBRID VEHICLE

(71) Applicant: Bayerische Motoren Werke Aktiengesellschaft, Munich (DE)

(72) Inventor: Christian Veit, Garsten (AT)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 464 days.

(21) Appl. No.: 18/270,328

(22) PCT Filed: Mar. 8, 2022

(86) PCT No.: PCT/EP2022/055780
§ 371 (c)(1),
(2) Date: Jan. 19, 2024

(87) PCT Pub. No.: WO2022/200030
PCT Pub. Date: Sep. 29, 2022

(65) Prior Publication Data

US 2024/0083440 A1 Mar. 14, 2024

(30) Foreign Application Priority Data

Mar. 26, 2021 (DE) ..................... 10 2021 107 623.4

(51) Int. Cl.
*B60W 30/20* (2006.01)
*B60K 6/20* (2007.10)
*B60W 10/08* (2006.01)

(52) U.S. Cl.
CPC ............... *B60W 30/20* (2013.01); *B60K 6/20* (2013.01); *B60W 10/08* (2013.01); *B60W 2510/0685* (2013.01)

(58) Field of Classification Search
CPC ................. B60W 30/20; B60W 10/08; B60W 2510/0685; B60K 6/20; G05D 1/0061;
(Continued)

(56) References Cited

U.S. PATENT DOCUMENTS

2011/0130996 A1 6/2011 Blind et al.
2016/0096523 A1* 4/2016 Ang .................... B60W 30/192 903/903

(Continued)

FOREIGN PATENT DOCUMENTS

DE 10 2008 001 408 A1 10/2009
DE 10 2014 202 624 A1 8/2015

(Continued)

OTHER PUBLICATIONS

International Search Report (PCT/ISA/210) issued in PCT Application No. PCT/EP2022/055780 dated Jun. 20, 2022 with English translation (4 pages).

(Continued)

*Primary Examiner* — Manglesh M Patel
(74) *Attorney, Agent, or Firm* — Crowell & Moring LLP

(57) ABSTRACT

An angular position detection device in a hybrid vehicle includes a crankshaft sensor for detecting an absolute internal combustion engine angular position with respect to a defined position mark, an electric machine, a rotor position sensor for detecting a relative electric machine angular position based on a reference point, in particular a reference pole comprising a plurality of identical rotor poles, and an electronic control unit. The control unit is configured such that the absolute internal combustion engine angular position and the relative electric machine angular position are detected when the internal combustion engine is stationary and the electric machine is stationary, and a mechanical angular reference of the internal combustion engine with respect to the electric machine is determined, on the basis of these angular positions, as an angle difference between the position mark and an initial reference point.

10 Claims, 2 Drawing Sheets

(58) Field of Classification Search
CPC .... G05D 1/0088; G05D 1/021; G05D 1/0214; G05D 1/0221; G05D 1/0223
USPC .......................................................... 701/22
See application file for complete search history.

(56) References Cited

U.S. PATENT DOCUMENTS

| | | | | |
|---|---|---|---|---|
| 2018/0056984 | A1 | 3/2018 | Yamaguchi et al. | |
| 2021/0021177 | A1 * | 1/2021 | Abel, Sr. | H02K 7/1815 |
| 2021/0388783 | A1 * | 12/2021 | Joseph | F02D 41/2438 |
| 2022/0228536 | A1 * | 7/2022 | Eloy | F02D 41/009 |
| 2025/0136118 | A1 * | 5/2025 | Park | B60W 20/00 |

FOREIGN PATENT DOCUMENTS

| | | | |
|---|---|---|---|
| DE | 11 2015 006 459 | T5 | 12/2017 |
| DE | 10 2017 222 841 | A1 | 6/2019 |
| DE | 10 2020 112 471 | A1 | 11/2021 |
| JP | 2001-20797 | A | 1/2001 |
| KR | 10-2018-0032301 | A | 3/2018 |

OTHER PUBLICATIONS

German-language Written Opinion (PCT/ISA/237) issued in PCT Application No. PCT/EP2022/055780 dated Jun. 20, 2022 (7 pages).
German-language Search Report issued in German Application No. 10 2021 107 623.4 dated Dec. 9, 2021 with partial English translation (15 pages).

* cited by examiner

ANGULAR POSITION DETECTION DEVICE IN A HYBRID VEHICLE

BACKGROUND AND SUMMARY OF THE INVENTION

The invention relates to an angular position detection device in a hybrid vehicle with an internal combustion engine and an electric machine.

The applicant's unpublished German patent application 10 2020 112 471 relates to a device for reducing vibration excitations of an engine-transmission composite system in a hybrid vehicle, with an internal combustion engine, with an electric machine, with an electric machine control unit, with an internal combustion engine control unit and with a communication bus between the electric machine control unit and the internal combustion engine control unit, wherein by appropriate programming of the electric machine control unit, a torque that reduces the vibration excitations of the engine-transmission composite system is generated by the electric machine. This takes into account an angular relationship (in the form of a constant angular offset) of the electric machine with respect to the internal combustion engine determined when the internal combustion engine is stationary or when the internal combustion engine is rotating slowly, the exact determination of which is not discussed in detail.

The object of the present invention is to improve the detection of the angular reference, in particular for such a device for the reduction of vibration excitations of an engine-transmission composite system in a hybrid vehicle.

This object is achieved by the claimed invention.

The invention relates to an angular position detection device in a hybrid vehicle with an internal combustion engine, with a crankshaft sensor for detecting an absolute internal combustion engine angular position with respect to a defined position mark, with an electric machine, with a rotor position sensor for detecting a relative electric machine angular position with respect to a reference point (preferably a reference pole, which is one pole of several similar rotor poles), and with at least one electronic control unit. The at least one control unit, preferably an internal combustion engine control unit and an electric machine control unit, is (or are) designed (in particular programmed) in such a way that the absolute angular position of the internal combustion engine and the relative angular position of the electric machine are detected when the internal combustion engine is stationary and when the electric machine is stationary, and that, based on these angular positions, a mechanical angular reference of the internal combustion engine with respect to the electric machine is determined as the angular difference between the position mark and an initial reference point (preferably an initial reference pole) and is stored.

Preferably, at a first stop or before the first start of the internal combustion engine and the electric machine, for the purposes of a learning function a mechanical initial angular reference relative to the initial reference point is determined.

At each subsequent start after a first start of the internal combustion engine and the electric machine, it is preferable to continue to calculate with the reference point already stored in the control unit, wherein in the event of a fault, the geometrically next pole is selected as the new reference point.

In an advantageous development of the invention, the following adjustment function is carried out after a learning function: At each subsequent start and/or stop of the internal combustion engine and the electric machine, the current mechanical angular reference is adjusted, wherein a first adjustment component represents the pole shifts between the initial reference point and the new reference point, and wherein a second adjustment component represents the mean value between the current mechanical angular reference and the newly calculated mechanical angular reference, taking into account the first adjustment component.

In general, the angular reference according to embodiments of the invention of the internal combustion engine with respect to the electric machine enables arbitrary applications to one of the control units with the angle/revolution rate information of the other control unit and its calculations when an internal combustion engine control unit and an electric machine control unit communicate with each other over a bus.

If, in the following, a stationary internal combustion engine or a stationary electric machine is referred to, this also includes one that is at least almost stationary or only rotating slowly.

The invention is based on the following considerations:

For example, in the case of internal combustion engines (gasoline or diesel engines) with a crankshaft starter-generator (KSG) integrated into the automatic transmission, the electric machine will be actively used in the future to reduce engine shaking movements. In the planned concept, the respective angle calculations are carried out in two control units, the internal combustion engine control unit and the electric machine control unit, which are connected via a comparatively slow bus. For example, the German patent application 10 2020 112 471 mentioned at the beginning deals with this.

Since if the electric machine does not have an absolute angle sensor to detect the electric machine angular position, one of the several (for example 10) poles of the same type of the electric machine must be selected by software as the reference pole. Under certain circumstances, this reference becomes invalid and must be recognized and corrected in the internal combustion engine control unit for error-free functioning. This is what the present invention relates to.

The rotor position sensor of the electric machine used according to embodiments of the invention detects the angular position only relatively between two poles of the electric machine. In particular, for the use of an electric machine as a damping system for the internal combustion engine, the angular reference to the working clearance of the internal combustion engine must be known. An additional sensor for absolute angle detection should be saved. Therefore, according to embodiments of the invention, a software solution (computer program product in the internal combustion engine control unit and/or electric machine control unit) is described. The software solution according to embodiments of the invention takes into account the aspect that the calculation of the rotor position angle may be based on an incorrect reference point, in particular the reference pole, and may therefore become invalid, which cannot be detected in the electric machine control unit.

By way of a learning function according to embodiments of the invention, at a first engine shutdown and/or immediately after synchronization at an engine start, it is preferable to determine the angular reference of the electric machine with respect to the working clearance of the internal combustion engine in the form of an initial mechanical angular reference of the internal combustion engine with respect to the electric machine. The exact procedure for this learning function is discussed in more detail below.

By way of an adjustment function according to embodiments of the invention, the initial mechanical angular reference between the two control units is adjusted in the electric machine control unit and/or in the internal combustion engine control unit at each subsequent start and/or shutdown process and is decomposed into two parts: A "large component" in the so-called "pole shifts" (i.e. multiples of the geometric angle between two poles) and a "small component" that depicts inaccuracy or disturbances in the angular position detection (scatter, play, tension in the engine/transmission drive train). The small component is averaged in order to increase accuracy and/or to damp overshoots due to disturbances, resulting in a comparatively slow adjustment of the mechanical angular reference. The pole shifts or the number of pole shifts are immediately taken into account in the control.

Boundary conditions for the learning function: As is well known, once it has synchronized, the internal combustion engine detects an internal combustion engine angular position at the so-called ignition TDC (TDC=top dead center) of a first cylinder. This is used as the preferred reference mark. The synchronization is performed during the start by way of a crankshaft sensor (for example, an inductive encoder by way of a pole wheel with 58 teeth and a tooth gap over two omitted teeth) and by way of a camshaft encoder. When the internal combustion engine and its control unit are switched off, this angular position of the internal combustion engine is lost. The angular resolution, for example using the usual pole wheel, is 6 degrees.

General note: In the case of four-stroke engines, a distinction is made between the charge exchange TDC between the exhaust and intake strokes and the ignition TDC between the compression and power strokes. The top dead center of the piston of a first cylinder serves as a reference for the crankshaft position. The angular position of the internal combustion engine thus determines the absolute crankshaft position at the ignition TDC (ZOT).

On the one hand, this absolute internal combustion engine angular position is relevant for embodiments of the invention when the internal combustion engine is stationary.

In the electric machine control unit (also called the inverter control unit) there is no absolute angular reference for determining the rotor position. Between the (for example 10) poles of the rotor there is a high-resolution angle measurement (0.1 degrees) by a rotor position sensor (RLS). The poles are equivalent, there is no absolute fixed reference point or reference pole. The rotor position sensor permanently detects the angle between the poles.

In the electric machine control unit, according to embodiments of the invention, preferably one pole is initially selected by software as the reference point or reference pole at each start. From this point on, the electromechanical electric machine angular position is summed up in relation to this reference point or reference pole and is reset to zero after 359 degrees.

If the electric machine and thus the electric machine control unit is switched off, the current electromechanical angular position at the initial reference pole is stored in the non-volatile memory (NV RAM) of the electric machine control unit when the electric machine is stationary and is read out again at the next start and, if appropriate, is also made available to the internal combustion engine control unit.

On the other hand, this relative electromechanical electric machine angular position when the electric machine is stationary is relevant for embodiments of the invention.

This electromechanical angle can be sent from the electric machine control unit to the internal combustion engine control unit via the data bus cyclically, for example at 200 ms intervals.

Learning function procedure: A further description follows of the particularly advantageous determination according to embodiments of the invention of the mechanical angular reference of the internal combustion engine with respect to the electric machine. This mechanical angular reference is the (constant for error-free operation) geometric relationship of the internal combustion engine with the electric machine. It is preferably defined as the angular difference between preferably the ignition TDC (or another defined absolute crankshaft position of the internal combustion engine) as the reference mark and the initial reference point or reference pole of the electric machine. It is assumed that the electric machine control unit performs an error-free pole-related electromechanical angular position calculation.

For this purpose, this mechanical angular reference is initially calculated in the course of a correspondingly programmed learning function (computer program product) in the internal combustion engine control unit and/or in the electric machine control unit, in particular in the event of a first-time engine stop, on the basis of the relative electric machine angular position described above when the electric machine is stationary and at the absolute internal combustion engine angular position described above when the internal combustion engine is stationary, and is stored in a non-volatile manner.

The learning function can also be triggered via the diagnostic interface after a visit to the workshop (for example required after the engine malfunctions or after opening the engine-transmission composite system).

The adjustment function has three tasks and is run at each engine stop (in the following, a reference pole is assumed to be the reference point):

The accuracy of the mechanical angular reference between the internal combustion engine and the electric machine should be improved by averaging deviations from the initial mechanical angular reference during each shutdown process.

Incorrect calculations of the mechanical angular reference as a result of an "incorrect" reference pole selected in the electric machine control unit are corrected by detecting so-called pole shifts or pole shift errors (rapid angle adjustment of multiples of 36 degrees for 10 poles). An "incorrect" reference pole is a selected reference pole that is not the initial reference pole.

After a workshop visit without a diagnostic job to run the learning function again, an angular error of up to 18 degrees (or generally half the angle of adjacent poles) can occur, which is then unlearnt—slowly by the averaging—("second adjustment component" or "small component", see above). Larger angular deviations are corrected "immediately" as pole shifts ("first adjustment component" or "large component", see above).

In a preferred development of the invention, before the engine start the electromechanical electric machine angular position is read out in the internal combustion engine control unit from the electric machine control unit with the electric machine stationary and is temporarily stored. Then the internal combustion engine control unit counts the pulses of the incremental encoder until the first time the gap in the pole wheel or the ignition TDC is detected and remembers this number of pulses. After synchronization, the internal combustion engine control unit recalculates the crankshaft angle before the engine start based on the previously counted number of pulses. As a result, the above-described angular position of the internal combustion engine with the internal combustion engine stationary is already retrospectively present immediately after the engine is started. Based on this recalculated internal combustion engine angular position when the internal combustion engine is stationary and the temporarily stored electromechanical electric machine angular position when the electric machine is stationary, the above-described mechanical angular reference between the electric machine and the internal combustion engine is already calculated before an engine stop.

The invention is preferably used to enable excitation reduction by way of transmission-internal electric machine control in hybrid drives, for example with gasoline or diesel engines.

The invention is described below in more detail on the basis of an exemplary embodiment.

DETAILED DESCRIPTION OF THE DRAWINGS

Figure 1:
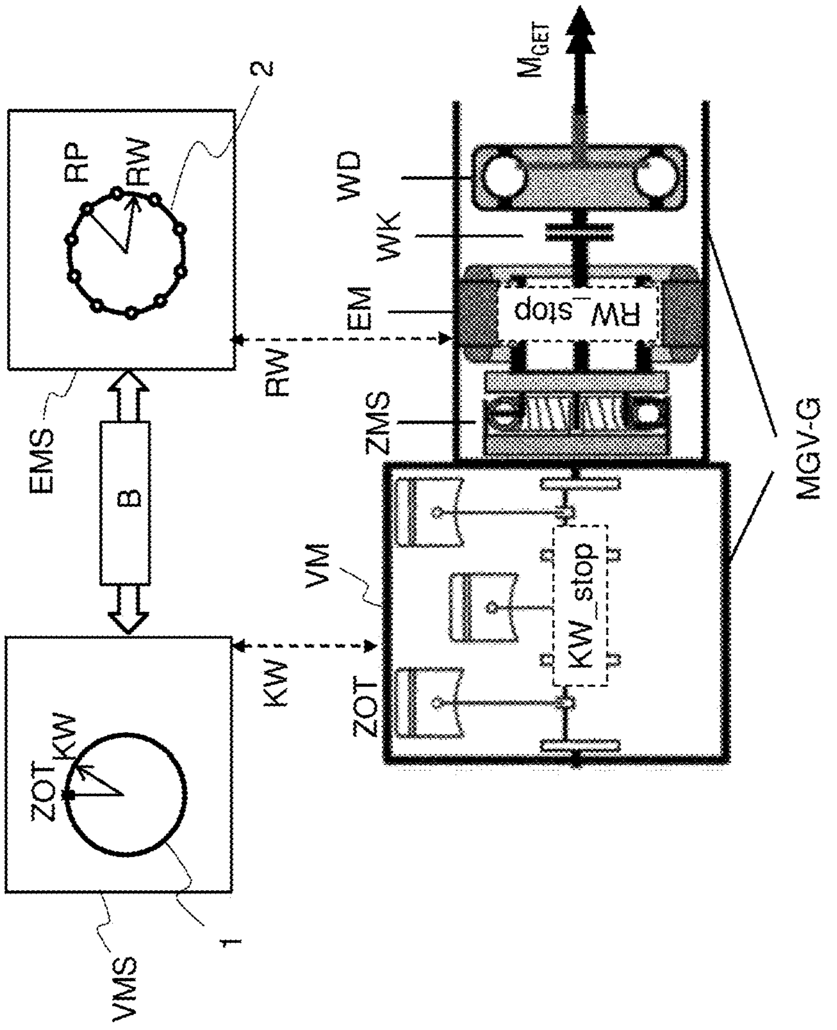
FIG. 1 shows schematically essential components and sizes of the entire engine-transmission composite system.

In FIG. 1, an engine-transmission composite system MGV in a hybrid vehicle is shown with an internal combustion engine VM, with an electric machine EM, with an electric machine control unit EMS, with an internal combustion engine control unit VMS and with a communication bus B between the electric machine control unit EMS and the internal combustion engine control unit VMS. The engine-transmission composite system MGV is housed in an engine-transmission composite system housing MGV-G, which can also contain a dual-mass flywheel ZMS, a torque converter clutch WK and a torque converter WD for an automatic transmission (transmission input torque MGET). In particular, the internal combustion engine VM and the electric machine EM are connected to the engine-transmission composite system housing MGV-G in a vibration-relevant manner. The electric machine EM can produce a total torque consisting of a basic drive torque and a torque reducing the vibration excitations of the engine-transmission composite system. For this purpose, the knowledge of the mechanical angular reference between the internal combustion engine and the electric machine is necessary, the calculation of which is discussed below and explained in more detail on the basis of FIG. 2.

Figure 2:
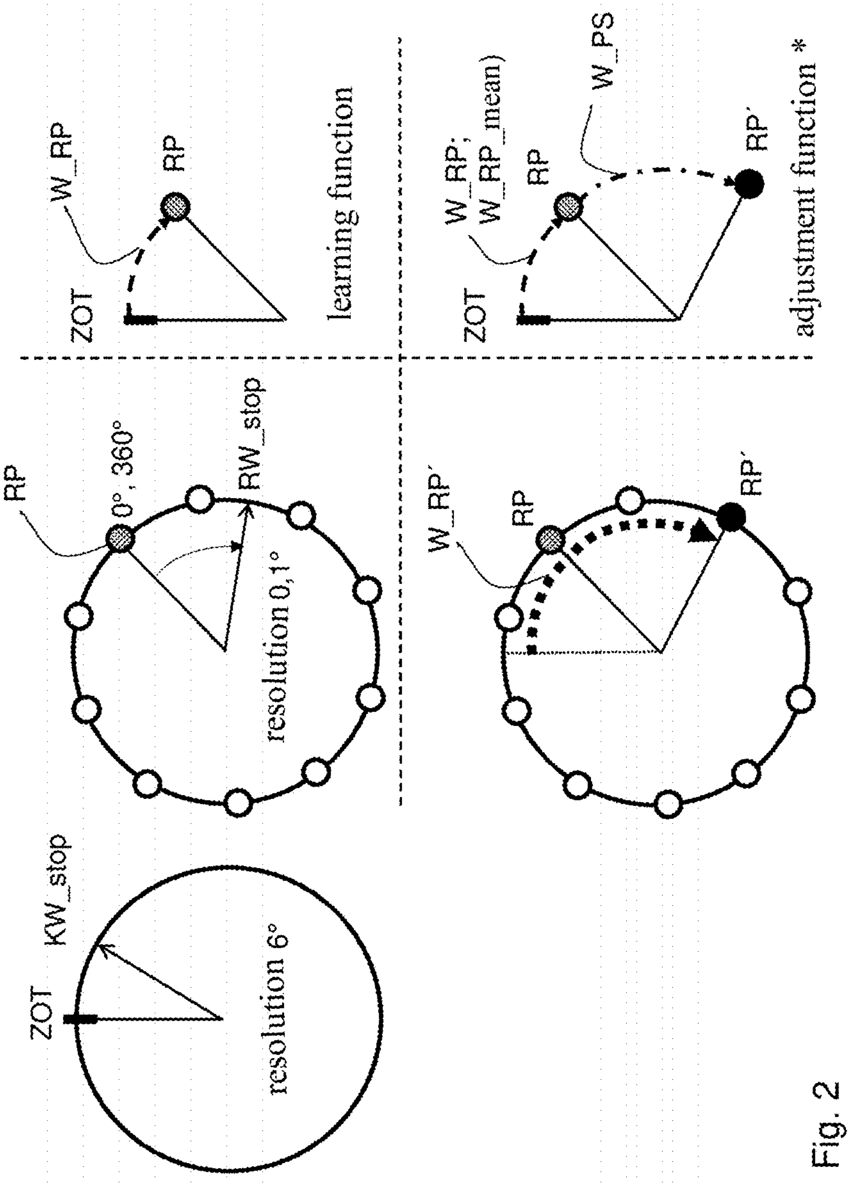
FIG. 2 shows a schematic representation of the mode of operation of the device according to an embodiment of the invention.

FIG. 2 shows in more detail how, by way of the appropriate design or programming of the electric machine control unit EMS and/or the internal combustion engine control unit, the mechanical angular reference of the internal combustion engine VM with respect to the electric machine EM, i.e. the initial mechanical angular reference W_RP of the learning function or the averaged mechanical angular reference W_RP_mittel of the adjustment function, can be determined, in particular when the internal combustion engine VM is stationary and the electric machine EM is stationary:

FIG. 1 and FIG. 2 show schematically a first angular position detection function 1 for the detection of an absolute internal combustion engine angular position KW with respect to the ignition TDC ZOT as a defined position mark and a second angular position detection function 2 for the detection of a relative electric machine angular position RW with respect to a reference point—here preferably to a reference pole, either the initial reference pole RP or a later new reference pole RP'. The initial reference pole RP is a reference pole detected for the first time during a learning function after a first start. A reference pole is basically a first pole of several similar rotor poles, in this case 10 poles, selected by the electric machine control unit EMS.

According to embodiments of the invention, when the internal combustion engine VM is stationary and the electric machine EM is stationary, the absolute angular position KW_stop of the internal combustion engine is detected by the internal combustion engine control unit VMS and the relative electric machine angular position RW_stop is detected by the electric machine control unit EMS. The control units EMS and VMS exchange data cyclically via the bus B. In at least one of the control units VMS and EMS, based on these angular positions RW_stop and KW_stop a mechanical angular reference W_RP or W_RP_mittel of the internal combustion engine VM with respect to the electric machine EM is determined as an angular difference between the position mark ZOT and the initial reference pole RP and is stored.

Preferably, the mechanical initial angular reference W_RP is determined at a first start or stop of the internal combustion engine VM and the electric machine EM for the purposes of a learning function related to the initial reference pole RP.

In a development of the invention, at each subsequent start after a first start of the internal combustion engine VM, in the electric machine EM the reference pole RP, which is stored in a non-volatile form (for example in an NVRAM), is selected, but in the event of a fault, it may not be the actual reference pole, but another pole, which is then geometrically recognized as the first pole. This pole is referred to as the new reference pole RP'.

Explanation: in the electric machine control unit, the last reference pole is stored when the control unit “falls asleep”. When the control unit “wakes up”, the stored reference pole is read out and the calculation continues from this pole, which however can actually be a new reference pole RP'. As long as the crankshaft-electric machine composite system has not continued to rotate during “sleep”, no pole shift will occur. If the readout of the NVRAM value does not work or the crankshaft or the electric machine has continued to turn, the electric machine control unit assumes the initial reference pole RP, but in reality it is the new reference pole RP' which is corrected by the adjustment function according to embodiments of the invention by way of recognized pole shifts.

A learning function is followed by an adjustment function, wherein at each subsequent start and/or stop of the internal combustion engine VM and the electric machine EM the current mechanical angular reference W_RP or W_RP_mittel(alt) is adjusted. Preferably, a first and a second adjustment component are calculated in the internal combustion engine control unit VMS. A first adjustment component W_PS represents the pole shifts PS, for example in the form of the number of pole shifts, between the initial reference pole RP and the new reference pole RP'. Furthermore, a second adjustment component W_RP_mittel(neu) represents the mean value between the current mechanical angular reference W_RPi (:=W_RP or W_RP_mittel(alt)) and the newly calculated mechanical angular reference W_RPi+1=W_RP'−W_PS. Here, W_RP' is the initially “wrong” determined angle difference between ZOT and the new reference pole RP' if it is not equal to the initial reference pole.

The adjustment function can be carried out at each stop of the internal combustion engine VM and the electric machine EM after a learning function.

In an advantageous embodiment of the invention, however, the adjustment function can also be carried out in the internal combustion engine control unit VMS immediately after a start of the internal combustion engine VM by temporarily storing, before the start of the internal combustion engine VM, the electromechanical electric machine angular position RW_stop when the electric machine EM is stationary, counting the pulses of the crankshaft sensor until the defined position mark ZOT is detected and, based on the counted number of pulses, recalculating the internal combustion engine angular position KW before the engine start. Based on this recalculated internal combustion engine angular position KW_stop with the internal combustion engine VM stationary and on the temporarily stored electromechanical electric machine angular position RW_stop with the electric machine EM stationary, the mechanical angular reference W_RP or W_RP_mittel can be calculated before a stop.

The invention claimed is:

1. An angular position detection device in a hybrid vehicle with an internal combustion engine and an electric machine, the angular position detection device comprising:

- a crankshaft sensor for detecting an absolute internal combustion engine angular position with respect to a defined position mark,
- a rotor position sensor for detecting a relative electric machine angular position in relation to a reference point, and
- at least one electronic control unit, wherein:
- an absolute angular position of the internal combustion engine and the relative angular position of the electric machine are detected when the internal combustion engine is stationary or at least only rotating slowly and the electric machine is stationary or at least only rotating slowly, and
- based on the absolute angular position of the internal combustion engine and the relative angular position of the electric machine, a mechanical angular reference of the internal combustion engine to the electric machine is determined as an angular difference between the position mark and an initial reference point and is stored.

2. The angular position detection device according to claim 1, wherein the reference point is a reference pole consisting of several rotor poles of the same type.

3. The angular position detection device according to claim 1, wherein at a first stop of the internal combustion engine and the electric machine, for purposes of a learning function, a mechanical initial angular reference is determined in relation to the initial reference point.

4. The angular position detection device according to claim 3, wherein the reference point is an initial reference pole.

5. The angular position detection device according to claim 4, wherein at each subsequent start after a first start of the internal combustion engine and the electric machine, a geometrically first detected pole is selected as a new reference pole on an assumption that the geometrically first detected pole is the initial reference pole.

6. The angular position detection device according to claim 5, wherein:

- at each subsequent start and/or stop of the internal combustion engine and the electric machine after the learning function, a current mechanical angular reference is adjusted,
- a first adjustment component represents pole shifts between the initial reference point and the new reference pole, and
- a second adjustment component represents a newly calculated mechanical angular reference, taking into account the first adjustment component.

7. The angular position detection device according to claim 5, wherein:

- at each subsequent start and/or stop of the internal combustion engine and the electric machine after the learning function, a current mechanical angular reference is adjusted,
- a first adjustment component represents pole shifts between the initial reference point and the new reference pole, and
- a second adjustment component represents a mean value between the current mechanical angular reference and a newly calculated mechanical angular reference, taking into account the first adjustment component.

8. The angular position detection device according to claim 1, wherein an adjustment function is carried out at each stop of the internal combustion engine and the electric machine after a learning function.

9. The angular position detection device according to claim 1, wherein an adjustment function in the internal combustion engine control unit is carried out immediately after a start of the internal combustion engine by temporarily storing the relative angular position of the electric machine when the electric machine is stationary before the start of the internal combustion engine, counting the pulses of the crankshaft sensor until the defined position mark is detected, and recalculating the internal combustion engine angular position before the engine start based on a number of pulses counted, in order to calculate the mechanical angular reference between the electric machine and the internal combustion engine before a stop based on the recalculated internal combustion engine angular position when the internal combustion engine is stationary and on a temporarily stored electric machine angular reference when the electric machine is stationary.

10. A hybrid vehicle comprising the angular position detection device according to claim 1.

* * * * *